United States Patent

[11] 3,583,553

| [72] | Inventors | William V. Spurlin;<br>Patrick J. Carroll, both of Indiana, Pa. |
|---|---|---|
| [21] | Appl. No. | 780,040 |
| [22] | Filed | Nov. 29, 1968 |
| [45] | Patented | June 8, 1971 |
| [73] | Assignee | FMC Corporation<br>San Jose, Calif. |

[54] VIBRATORY MATERIAL HANDLING APPARATUS
9 Claims, 6 Drawing Figs.

[52] U.S. Cl. .................................................. 198/220
[51] Int. Cl. ................................................. B65g 27/20
[50] Field of Search .................................... 198/220;
222/55, 196, 199; 209/366.5, 341, 367, 365.2

[56] References Cited
UNITED STATES PATENTS

| 2,771,179 | 11/1956 | Musschoot | 209/367 X |
| 2,893,559 | 7/1959 | Teuteberg | 198/220 X |
| 3,087,603 | 4/1963 | Petrea | 198/220 |
| 3,203,264 | 8/1965 | Evans | 198/220 X |
| 3,212,629 | 10/1965 | Maeder et al. | 198/220 |

*Primary Examiner*—Albert J. Makay
*Attorneys*—F. W. Anderson and C. E. Tripp

ABSTRACT: Apparatus for producing work by vibrations having a particulate material-handling assembly vibrated by a driver which is mounted on said assembly by means of elastomeric bodies, the driver having a rotary eccentric mass which generates vibrations which are transmitted to the assembly along a predetermined line of attack axis. The work-producing vibrations are transmitted along the attack axis by compression of the elastomeric bodies while vibratory excursions other than in the direction of such attack axis are dissipated through flexure of the elastomeric bodies in shear.

VIBRATORY MATERIAL HANDLING APPARATUS

BACKGROUND OF THE INVENTION

This invention relates generally to vibratory material-handling apparatus. Vibrating screens, vibrating feeders, vibrating conveyors and vibrating separators are typical of the types of apparatus to which the invention is applicable. More particularly the invention relates to a novel vibratory mounting for the driver or vibration exciter used in apparatus of these types. The invention can most readily be explained as applied to a vibrating feeder although it will be understood that the use of this type of apparatus for explaining the invention is merely illustrative.

In handling bulk particulate material there are numerous ways for conveying such material and feeding it over an open end of a conveyor to a desired delivery point. This invention is concerned only with the type of vibratory apparatus in which the conveyor or feeder trough is vibrated as a free mass, i.e., the trough, and in fact, the apparatus as a whole, is suitably isolated from the ground so that it may be excited into work-producing vibratory movement in response to oscillating force applied to the feeder trough. This is to be distinguished from a feeder trough which is connected to the excited force, as for example, where the trough is driven through an arm rigidly connected to a fixed stroke eccentric drive.

Referring by way of example to a vibrating feed application wherein this invention would be applicable, a problem encountered in prior art devices of this type stems from difficulty encountered in achieving predictably uniform feed rates. Changes in feed rate, despite application of a constant vibrating exciter force, can result due to variations that may occur in the magnitude of the head load of material piled onto the feeder trough while the apparatus is in operation. Typically the feeder trough is resiliently suspended beneath the outlet of a hopper and as the volume of material in the hopper diminishes or where the material flows in intermittent surges from the hopper onto the feeder trough, different operating loads or head loads are encountered by the apparatus.

The head load of material piled onto the feeder trough imparts damping to the vibratory motion of the trough which tends to diminish the amplitude of trough vibrations. Also, the material itself by reason of internal friction between the particles of the material will dampen the trough's vibratory motion by internal material damping which will vary depending on the particular characteristics of the material. When the vibration-generating drive for the feeder has a frequency closely approaching the natural frequency of the trough in its unloaded state, the damping effect of material flowing onto the trough can materially diminish the extent of the vibrating stroke of movement of the trough. Obviously this has a corresponding effect on the feed rate as represented by the rate of movement of material along the trough. It follows that where the head load imparted by the weight of material discharged onto the trough from the hopper varies from one moment to the next during feeder operation, the damping effect also varies and in turn then the feed rate varies.

It is a principal object of the instant invention to provide vibratory material-handling apparatus such as a vibratory feeder or the like wherein reliably uniform feed rates may be obtained for each vibrating frequency and magnitude of the exciting force with minimal variation in the feed rate occurring when the head load and the associated internal damping of material supplied to the apparatus varies during apparatus operation.

It is a further important object of the invention to provide vibratory material-handling apparatus wherein a significant degree of internal damping is built into the resilient supporting means for the vibratory driver such that the added damping and damping variations created by the head load of material discharged onto the apparatus will have a minimal effect on changing the vibrating stroke of the apparatus such that its operation will remain essentially uniform irrespective of variations in head load during operation.

A further object of the invention is to provide a vibratory material feeder or the like in which the exciter force is supplied by a driver including a motor carrying one or more rotated unbalanced weights, the driver being supported on the feeder trough by a resilient assembly of elastomeric bodies. This assembly is characterized by having a spring rate or K factor in one direction, identified as the line of attack axis which is in the order of eight times the spring rate or K factor of the assembly in a direction normal to the line of attack axis. The elastomeric bodies transmit vibrations from the driver by compression of such bodies in the direction of the line of attack axis with the natural frequency of the trough and driver supporting frame combination being significantly above the frequency of the driver. This results in the unbalanced weights in the driver-delivering pulsations to the trough through the elastomeric bodies with natural frequency amplification in the direction of the line of attack axis being achieved while the components of vibratory force derived from the unbalanced weights other than along the line of attack axis are absorbed or dissipated by flexure of the elastomeric bodies in shear.

Other objects, uses and advantages of the instant invention will be obvious or become apparent on consideration of the detailed description and the drawings accompanying such description as referred to hereinafter.

DETAILED DESCRIPTION

The vibrating material-handling apparatus may take the form of a variety of different types of equipment wherein work is performed on bulk particulate material by controlled vibrations produced in the apparatus. Purely as illustrative of one application for this invention, the drawings illustrate the invention applied to a vibrating feeder. Accordingly the description hereinafter will be made with specific reference to characteristics and components of apparatus where the invention is embodied in a feeder although it is to be understood that this specific description of a feeder apparatus is in no way to be taken as restrictive of the areas to which the invention is applicable.

Figure 1:
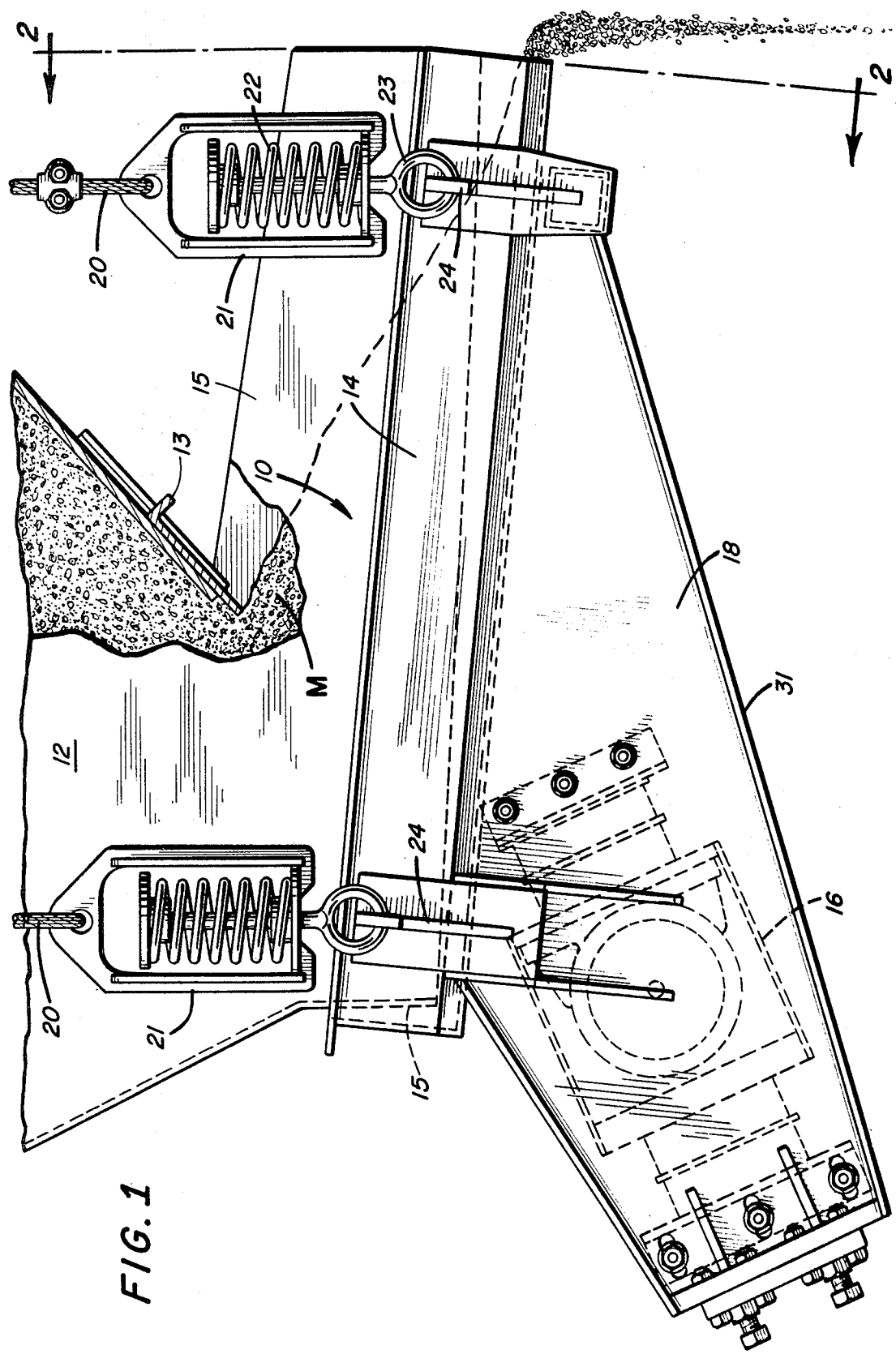
FIG. 1 is a side elevational view of the vibratory material-handling apparatus of this invention.
Figure 2:
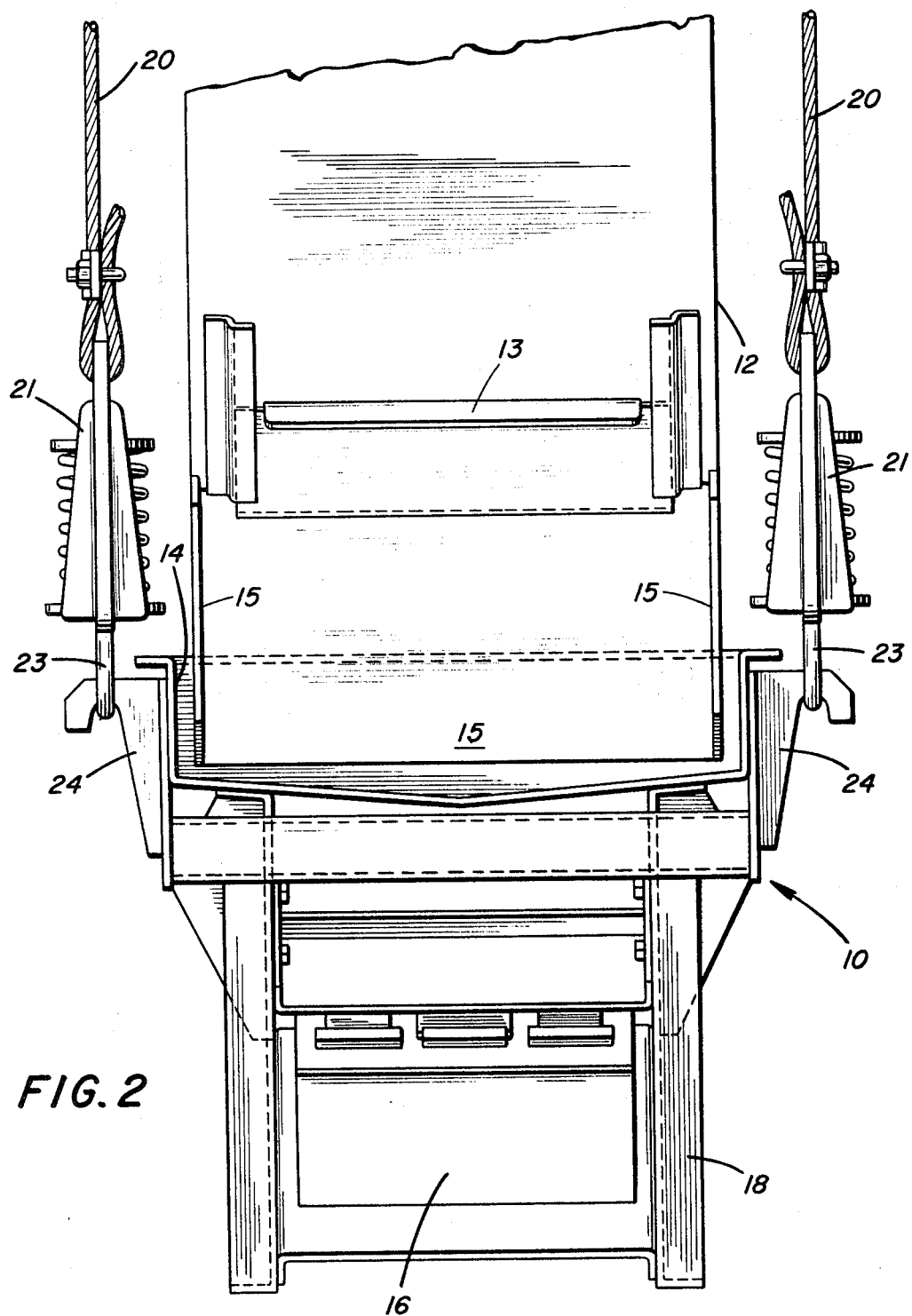
FIG. 2 is a front end elevational view taken along line 2-2 of FIG. 1.

Referring to FIGS. 1 and 2, a vibratory feeder 10 is shown mounted beneath the outlet of a hopper 12 with the material M flowing from the hopper discharge outlet beneath an adjustable gate 13 at the lower forward end of the hopper discharge outlet onto the trough 14 of the feeder. The hopper outlet is preferably provided with skirts 15 which extend down within the upstanding sides and rear of the trough 14 as shown in FIGS. 1 and 2. In achieving controlled movement of the bulk particulate material M from the hopper 12 at a desired flow rate along the trough 14, the trough is vibrated by a driver 16 mounted in a supporting frame 18 which frame with trough 14 forms a particulate material-handling assembly.

As is characteristic of vibratory material feeders of the type hereunder consideration, the feeder is resiliently supported so that the work-producing vibrations of the feeder trough 14 are effectively isolated from the surrounding environment. When so supported the assembly, made up of trough 14 and frame 18, acts as one free mass, the driven mass, and the driver 16 acts as a second free mass, the driving mass. Thus, the controlled nature of the vibrations imparted to the feeder trough 14 through the mountings of driver 16 to the assembly may be regulated independent of surrounding stationary structures to achieve the desired rate of material flow from the hopper 12 along the trough. The material is discharged from the end of the trough, frequently to other equipment which may take the form of a belt conveyor by means of which the material is conveyed away from the vibratory feeder.

The means for resiliently supporting the feeder 10 is shown on FIGS. 1 and 2 in the form of cables 20 which are connected to their upper ends to suitable stationary supports (not shown) positioned so that the feeder will be appropriately located beneath the outlet of hopper 12. The lower end of each cable 20 is connected to a yieldable spring device 21. Each such device includes the combination of a spring 22 with an eye 23 at the lower end of the device. This eye is engaged with a laterally extending hook 24 fixedly secure to the side of the feeder trough 14. The spring 22, as is conventional in such resilient spring devices is under compression when the load of the feeder 10 is suspended from device 21. In such state, the upper member of the device engages beneath the lower end of spring 22 and a rod projecting upwardly through the spring from eye 23 has a flanged head at its upper end which engages the upper end of the spring. As illustrated, and as is quite common in the support of such vibratory feeders, four cables 20 and four spring devices 21, one at the lower end of each cable, are provided. Likewise the trough 14 of the feeder 10 has four hooks 24 welded to the sides of the trough 14 with two such hooks being provided at spaced points along each side of the trough.

The frame 18 of the material-handling member is secured, as by welding, to the bottom of the trough 14. This frame defines a support for the driver 16 such that the driver is mounted within the frame to impart vibrations generated by the driver to the material-handling assembly, made up of trough 14 and frame 18, along a predetermined line of attack axis. This axis is illustrated on FIG. 3 by the double arrows A which indicate the line of movement of the vibrations that cause work-producing vibratory movement of the trough 14.

Figure 3:
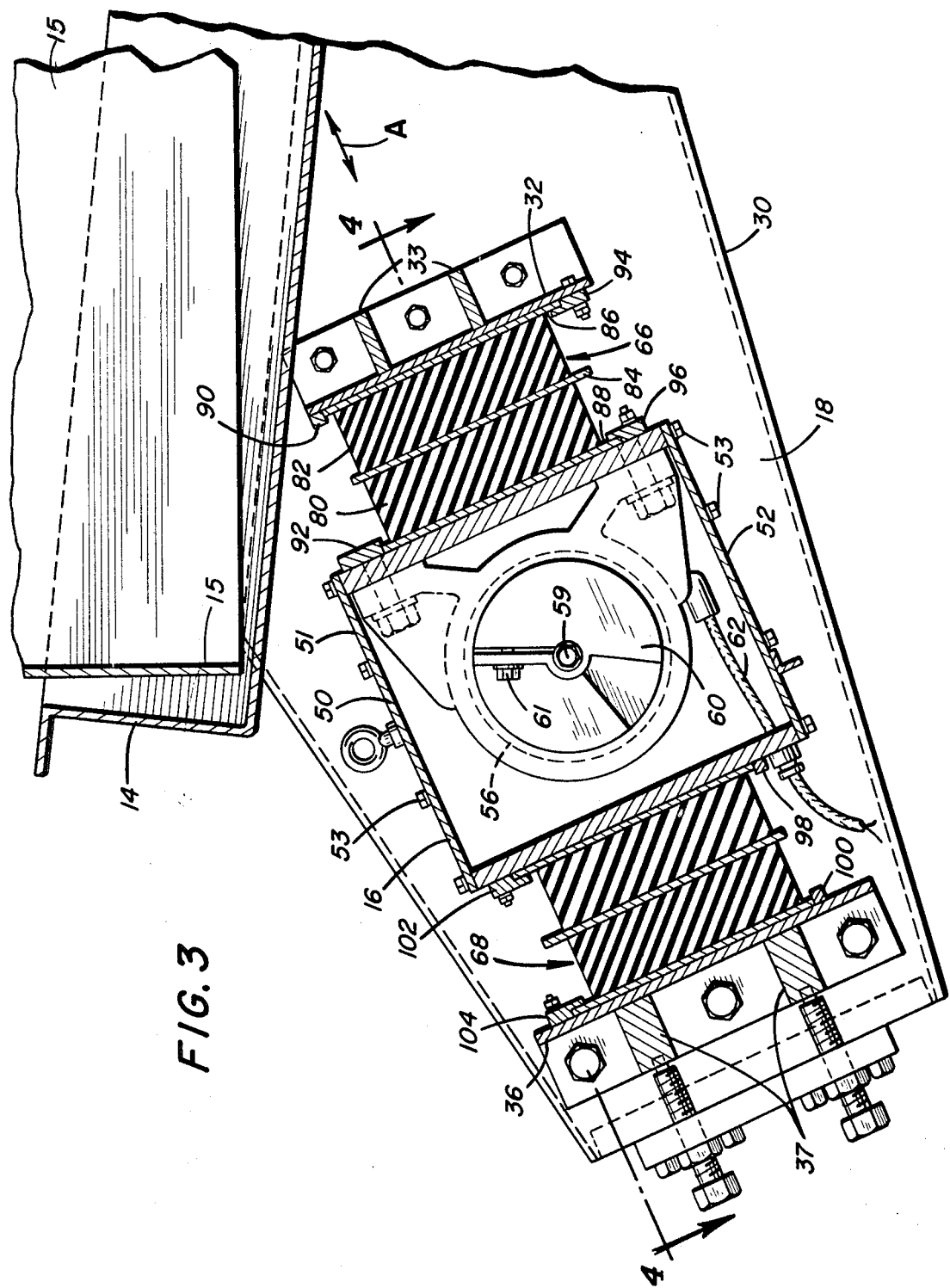
FIG. 3 is a vertical sectional view of the material-handling member, the driver and driver mounting.

Specifically, the frame 18 is constructed of spaced side members 30 and 31 which, as illustrated, taper rearwardly and extend downwardly beneath the trough 14. A forward flanged support plate 32 provided with reinforcing ribs 33 is bolted to the side members 30 and 31. This support plate 32 is mounted, as best shown in FIGS. 1 and 3, to be disposed generally perpendicular to the line of attack axis represented by the line including the double arrows A and serves to provide a rigid mounting part of frame 18 for securing the forward end of the resilient means which supports the driver 16.

A rear support plate 36 having flanges along its lateral edges and reinforced by ribs 37 is mounted to bridge between the side members 30 and 31 adjacent the rear most end of such members. The mounting of plate 36 is accomplished by means of suitable fasteners illustrated in the form of nut and bolt connectors 38. The side members 30 and 31 are slotted at 39 where the bolts of connectors 38 pass through the respective side members in fastening plate 36 to the side members. This enables the rear plate 36 to be adjusted longitudinally of frame 18 to achieve the desired degree of compression of the resilient supporting means for the driver 16 for the purpose as will be explained in detail hereinafter. Once the plate 36 has been appropriately adjusted, the connectors 38 may be firmly tightened to fixedly mount the plate and enable it to properly support the driver 16. As in the case of plate 32, plate 36 is disposed perpendicular to the line of attack axis which includes the double arrows A.

To enable appropriate controlled adjustment of the rear driver-mounting plate 36 relative to the slotted openings 39 before connectors 38 are tightened, the rear ends of side members 30 and 31 are each provided with a mounting bracket 40 each of which threadably receives two adjusting screws 42. The adjusting screws 42 are provided, one above the other, on each of the ends of the side members 30 and 31. The reduced ends of screws 42 are received in recesses formed in the rearwardly facing surfaces of the ribs 37 that reinforce plate 36. Each adjusting screw 42 is also provided with a locking nut 44 threaded thereon to facilitate fixedly securing the adjusting screw in its desired position.

It will be appreciated that the four adjusting screws 42, two at each end of the rear support plate 36, can be readily adjusted inwardly to press the plate 36 toward the forward plate 32 and thereby achieve the desired compression in the resilient means which supports the driver 16 between plates 32 and 36. As will become apparent hereinafter the degree of compression imparted to the resilient driver-supporting means is significantly important in tuning the apparatus such that the desired work-producing vibratory movement of the trough 14 will be achieved when the driver 16 is energized. Once the adjusting screws 42 have been set for the desired positioning of plate 36 the locking nuts 44 may be tightened down against the respective brackets 40 and in turn the nut and bolt connectors 38 tightened so that the plate 36 is securely fastened in place for operation of the vibrating material-handling apparatus.

Reference may now be made to the construction of driver 16 which generates vibrations to excite work-producing vibratory movement in the trough 14. As will be obvious the work-producing vibrations generated by the driver are transmitted through the resilient driver supporting means to the plates 32 and 36 and then to the side members 30 and 31. The plates and side members making up the frame 18 together with trough 14 constitute the material-handling assembly.

The driver 16 is comprised of a housing 50. As shown in section on FIG. 4, this housing is made up of plates welded into a rectangular configuration. The open ends of this rectangular configuration are closed by upper and lower covers 51 and 52 suitably secured to the ends of the rectangular configuration by cap screws 53.

Motor means, which may appropriately take the form of an electric motor 56, is mounted within housing 50 as by means of stud and nut fasteners 58 which firmly secure the base of the motor to one side of the rectangular housing 50. As illustrated, the shaft 59 of motor 56 is disposed with its axis horizontal in its mounted position within housing 50. As mounted by the resilient means supporting the driver, this axis also is intersected by the line of attack axis represented by the double arrows A.

In the embodiment illustrated, an eccentric rotating mass is provided in the form of weights 60 fixedly clamped on the opposite ends of the motor shaft 59. These weights are eccentrically disposed relative to the axis of shaft 59 and in most use applications will be essentially aligned with each other in their eccentric positions on the opposite sides of motor 56. A suitable clamping bolt 61 (FIG. 3) is tightened to assure that the eccentric weight is firmly fastened to rotate with motor shaft 59.

An electric cable 62 extends from motor 56 outwardly through a wall of housing 50 to be connected to a suitable power source so that the motor may be suitably energized to generate vibrations through the eccentric rotating mass made up of weights 60 at the opposite ends of motor shaft 59.

It is to be understood that in some installations a single eccentric weight may be driven as the rotating mass to generate vibrations. Also in installations where a sizeable quantity of particulate material is to be handled through application of work-producing vibratory movement and in particularly large feeders, the driver 16 may be constructed with two or more motor means. In such an installation the axes of the shafts of the motors will be mounted parallel to each other. When the motors are simultaneously energized the imbalance of the eccentric weights carried on the respective motor shafts will add together to generate reinforced vibrations and in turn impart stronger vibratory impulses to the material-handling assembly. Where a trough such as 14 is vibrated to produced work in flow of the material along the trough, these stronger vibrations, of course, provide increased flow volume per unit of time, are better suited for moving heavy bulky materials and of course are necessary for larger feeder constructions.

Reference may now be made to the resilient means which supports the driver 16 between plates 32 and 36 of frame 18. This resilient means takes the form of a pair of elastomeric bodies 66 and 68 which are generally similar in their construction. Elastomeric body 66 is mounted between the forward end of driver 16 and forward plate 32 while elastomeric body 68 is mounted between the rearward end of driver 16 and rear plate 36.

Figure 4:
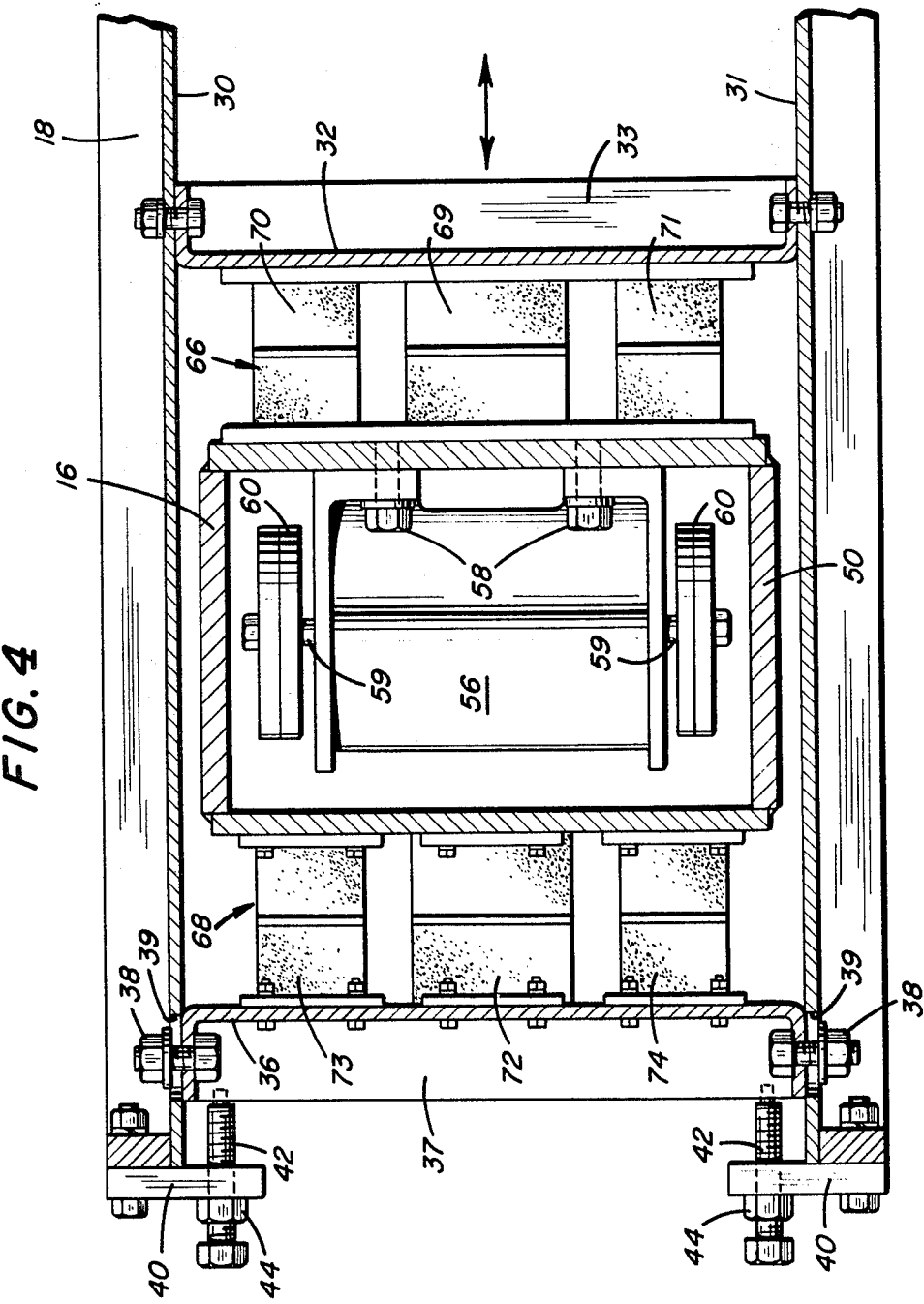
FIG. 4 is a sectional view taken along line 4-4 of FIG. 3.

Each of bodies 66 and 68 may appropriately be assembled from several elastomeric units. As shown in FIG. 4, three such units, 69, 70 and 71, are assembled side by side across the width of plate 32 in forming the elastomeric body 66. Likewise three units, 72, 73 and 74, are assembled in side by side relation across the width of plate 36 at the rear end of driver 16 to form elastomeric body 68.

The formation of the elastomeric bodies 66 and 68 in an assembly of several units has the advantage of enabling the substitution, during construction of the vibrating material-handling apparatus, of different units having different resilient characteristics to get the desired frequency response relationship between the driver and material-handling assembly. This can be important in facilitating tuning the vibrating action of the apparatus to obtain the proper relation between the natural frequency of the material-handling assembly and the frequency of the driver. It will of course be obvious that in lieu of constructing the elastomeric bodies 66 and 68 from an assemblage of three units is as specifically illustrated, the bodies may be constructed in the form of a single unit or by an assembly of two or more units. In the vibratory feeder application for the invention as disclosed, the positioning of the elastomer bodies is chosen to achieve proper frequency relationships for all 6° of possible free movement. The bodies and their positions thus take into consideration different lateral spacings, heights and widths for the bodies.

Each of the elastomeric body 66 and 68 has oppositely facing end surfaces. In the case of each body, one such end surface is secured to the frame 18 through either frame plate 32 or 36 while the other end surface of each body is secured to the driver 16. As is apparent, the mounting of the motor 56 within housing 50 disposes the motor shaft 59 parallel to the planes of these end surfaces of the elastomeric bodies. Further, each elastomeric body has exposed edge faces surrounding the end surfaces of the body. The mounting of the elastomeric bodies 66 and 68 on opposite sides of the driver 16 is such that vibratory movements in the direction of the line of attack axis are transmitted through bodies by compression of the elastomeric material while movements of the driver laterally of such attack axis are dissipated by flexure of the bodies in a shear plane generally perpendicular to the attack axis.

The construction of the elastomeric bodies 66 and 68 utilized in the apparatus of the instant invention has certain important features. Structurally the units 69—74 making up elastomeric bodies 66 and 68 are identical although the physical size and physical characteristics of the elastomeric material may be varied between different units. Thus, a description of only one unit will suffice for an understanding of the important structural features incorporated in each of the elastomeric bodies 66 and 68.

Referring to FIG. 3, each of the elastomeric bodies 66 and 68 is shown in section. Each body, or each unit of a body where the body is made up from an assembly of two or more units, is constructed of two blocks 80 and 82 of suitable elastomeric material, such as natural rubber, which are bonded to the opposed faces of an intermediate plate 84. Any appropriate bonding technique may be employed to permanently affix blocks 80 and 82 to the faces of plate 84. The oppositely facing ends of the blocks 80 and 82 are in turn bonded to base plates 86 and 88 which thus form the end surfaces of the elastomeric body. These end surfaces are secured respectively to the driver 16 and the plates 32 and 36 of frame 18. Again appropriate bonding techniques may be employed to permanently affix the base plates 86 and 88 to the outer ends of elastomeric blocks 80 and 82.

This construction for the elastomeric bodies in the form of a laminated structure preferably employs an aluminum plate to constitute the intermediate plate 84. This intermediate plate and the use of aluminum as the material for such plate provides a two fold benefit. Plate 84, which as shown projects somewhat beyond the edge faces of the elastomeric blocks 80 and 82, acts as a heat sink to help cool the elastomeric body. During operation of the vibratory apparatus the elastomeric bodies 66 and 68 provide a degree of damping by reason of the characteristics of the elastomeric material employed and because the vibrations are transmitted through the bodies in the material-handling assembly in compression. The energy dissipated through this damping action is essentially converted into heat energy and thus the presence of plate 84 is important in conducting this heat energy away from the elastomer blocks 80 and 82. In this respect it may be pointed out that the elastomeric material should be selected to have good stability and particularly the characteristic of not undergoing change in its resilient characteristics when it becomes heated up. The material should also have good heat dissipation characteristics.

The intermediate plate 84 laminated with elastomer blocks 80 and 82 serves the added function of giving elastomeric bodies 66 and 68 a desired particularly high stiffness ratio to achieve the preferred operating characteristics for the apparatus. The stiffness ratio refers to the ratio of material deflection in compression to material deflection in shear for the elastomeric body. A high stiffness ratio is particularly important. A stiffness ration of about 8:1 is achieved with a single intermediate plate 84 in a laminated construction using two blocks 80 and 82. By laminating two intermediate plates with three elastomer blocks, an elastomeric body usable in place of 66 and 68 may be obtained having a stiffness ratio in the order of 10:1. It may be noted that absent the use of an intermediate plate 84 a single block of elastomer, such as natural rubber, would normally have a stiffness ratio of between 4—6:1.

The height of the elastomeric body 66 or 68 should be selected to avoid excessive compression of the body when the apparatus is in operation. Preferably in such operation the height of the elastomeric body should not be compressed more than about 10 percent in the excursions of the vibratory movement. Should the body have an unreasonably short height the excess compression would result in producing undue heat in the elastomer. The cross-sectional area of the laminated bodies 66 and 68 is selected to provide the maximum available area to handle the heat generated by the action of the material in compression balanced against keeping a minimum area for the equipment to have reasonable size dimensions. Again the assembly of three units to make up each elastomeric body 66 and 68 can be advantageous in that the three spaced units permit better heat dissipation by circulation of air around the units during operation of the apparatus.

The mounting of the elastomeric bodies 66 and 68 may best be seen from FIGS. 3 and 4. An upper rail 90 is secured along the upper edge of plate 32. Similarly a rail 92 is secured along the upper forward end of driver 16. A flanged clamp 94 is bolted along the lower edge of plate 32 and a similar flanged clamp 96 is bolted along the lower forward edge of housing 50 of driver 16. The three units 69, 70 and 71, making up elastomeric body 66, are secured in place by the base plate 86 or 88 at each end of the end surfaces of the body being engaged with the underside of the respective rails 90 and 92. The lower ends of these base plates are received under the flanged lips of the clamps 94 and 96 bolted to the plate 32 and driver 16 respectively. It is understood that since, in mounting the driver 16 between plates 32 and 36, the elastomeric bodies 66 and 68 are subjected to an initial degree of compression, it follows that the baseplates 86 and 88 will not be free to move away from abutting engagement with the underside of rails 90 and 92.

The elastomeric body 68 is secured between the other end of driver 16 and plate 36 in a fashion similar to that described for the mounting of elastomeric body 66. Rails 98 and 100 are secured to the lower rear end of the housing 50 of driver 16 and along the lower end of plate 36, respectively. The upper end of housing 50 has a flanged clamp 102 bolted thereto and the upper end of plate 36 has a flanged clamp 104 bolted therealong. The base plates 86 and 88 on the end surfaces of the elastomeric body 68 are disposed with the respective lower edges thereof resting in abutting relation to the upper edges of rails 98 and 100. The upper edges of these base plates 86 and 88 are clamped beneath the flanges of clamps 102 and 104. Thus the elastomeric body 68 is securely positioned intermediate driver 16 and plate 36.

It may be noted that in the form of the apparatus illustrated each of the rails 90, 92, 98 and 100 takes the form of a continuous strip extending along and engaged by the base plates of each of the three units making up the elastomeric body 66 or 68. On the other hand, the flanged clamps 94, 96, 102 and 104 are in the form of short clamp lengths to accommodate the clamping of the base plate of each separate unit making up an elastomeric body.

It is important to note that a vibratory apparatus incorporating the laminated elastomeric bodies 66 and 68 supporting a driver 16 in the manner heretofore described, utilizes particular characteristics of an elastomer in applying the required vibrations to obtain work-producing vibratory movement of the trough 14. The elastomer blocks 80 and 82 laminated to intermediate plate 84 when stressed in shear have a relatively low spring rate. A nearly linear relationship between displacement and applied force exists under shear stresses. Since the elastomeric bodies are essentially stressed in shear by the driver vibrations other than in the direction of the line of attack axis, the shear stress in these bodies dissipates these undersired or unusable lateral vibratory movements. The damping effect of the elastomeric bodies in shear serves to dissipate any vibrations other than those of the drive frequency. This avoids the apparatus picking up an odd frequency vibration which could be present in a nondamped excited mounting such as a mounting using steel coil springs such as used in some prior art devices. On the other hand, the elastomer blocks 80 and 82 forming the elastomeric bodies 66 and 68 when stressed in compression provide a relatively high spring rate and a steep applied force versus displacement curve is characteristic of an elastomer in compression. The energy of damping is essentially absorbed by the elastomer of the bodies 66 and 68 with a small portion being absorbed by the material being moved along trough 14. This energy is converted primarily into heat.

Figure 5:
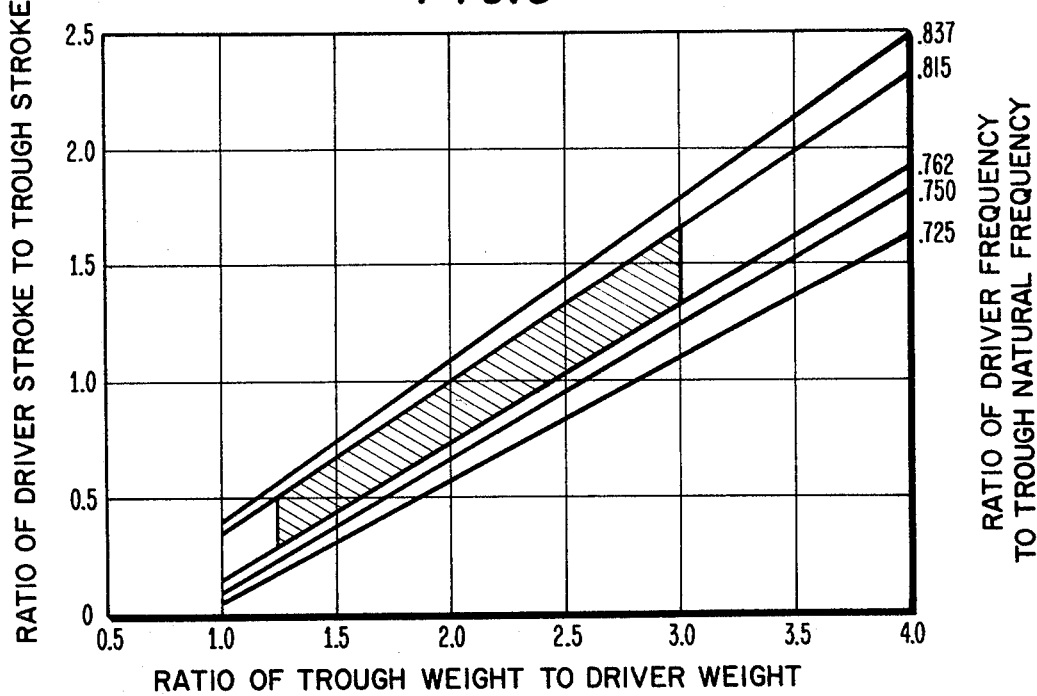
FIG. 5 is a graph depicting the preferred design-operating parameters for the apparatus.

FIG. 5 graphically illustrates the preferred design range for a vibrating material-handling apparatus in the form of a vibratory feeder as described hereinabove. On this figure the abscissa is plotted for the ratio of the trough weight to the driver weight. In this regard the "trough weight" includes not only trough 14 but also the various components going to make up frame 18. Thus the trough 14 and frame 18 collectively constitute a material handling assembly which is the "trough weight" contemplated on FIG. 5. In this ratio the "driver weight" contemplates the total weight of the driver 16. In FIG. 5 the ordinate is plotted for the ratio of the driver stroke to the trough stroke. The diagonal lines plotted on the graph of FIG. 5 represent operating conditions under different ratios of the driver frequency to the natural frequency of the trough. Again the "natural frequency of the trough" contemplates the natural frequency of the mass making up the entire particulate material handling assembly which includes not only trough 14 but also frame 18. Five different ratios are plotted ranging from 0.725 to 0.837.

The shaded portion of the graph of FIG. 5 is indicative of the preferred operating characteristics for a vibratory feeder made in accordance with the instant invention. Interpreting this shaded portion, the total weight of the particulate material handling assembly or "trough weight" preferably is not less than 1.25 times the total weight of the driver and not more than three times the weight of the driver. Similarly a driver frequency not less than 0.762 times the natural frequency of the mass of such assembly of "trough weight" is desired and preferably the driver frequency is not more than 0.815 times the natural frequency of the assembly or trough.

Figure 6:
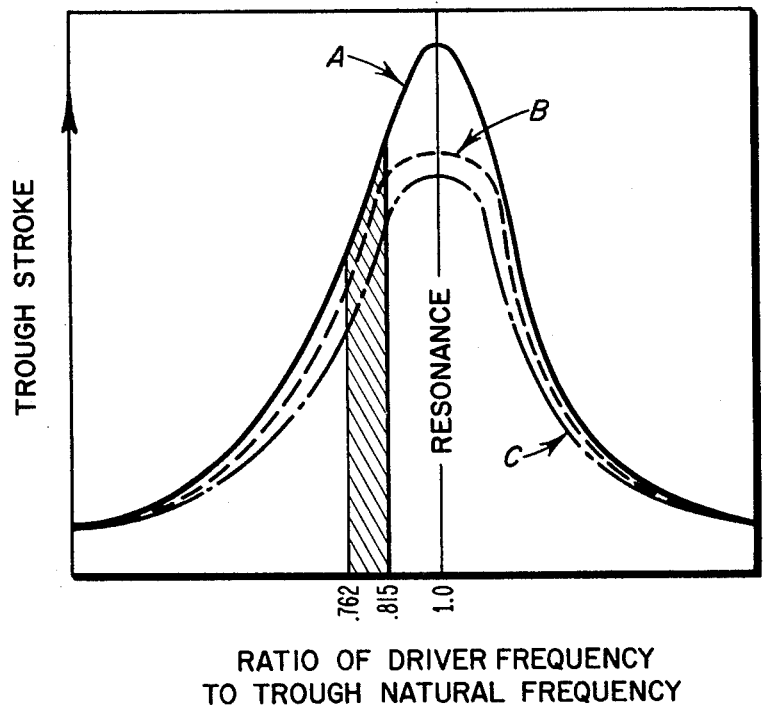
FIG. 6 is a graph illustrating the relation between the ratio of driver to trough, natural frequencies and the magnitude of the vibratory stroke.

Having the preferred design range as depicted on FIG. 5 in mind, the action of vibrating apparatus constructed in accordance with this invention as compared with the physical vibrating action of typical prior art equipment may be described with reference to FIG. 6. This figure shows a series of three curves A, B and C plotted for the trough stroke versus the ratio of the driver frequency to the trough natural frequency.

When the frequency ratio is 1.0, the maximum stroke for the trough is to be expected. In typical prior art vibratory equipment, wherein relatively little damping is present in the equipment as constructed, a fairly high peak amplitude curve such as depicted by curve A on FIG. 6 is characteristic for the vibrating action of such equipment. However in apparatus made in accordance with this invention substantial damping is present in the apparatus as constructed. Thus in even its unloaded condition, i.e., in a vibratory feeder where no material is present on the feeder trough, the vibratory action for different ratios of driver frequency to trough natural frequency is typically represented by a curve such as B on FIG. 6.

However the head load imparted to the trough 14 in a vibratory feeder application by reason of material M resting thereon beneath the outlet of hopper 12 causes a degree of damping. Since the damping effect built into the vibratory apparatus in accordance with this invention results in an operating curve B, the added damping effect created by the material M on trough 14 has a relatively small effect in diminishing the magnitude of the stroke. Thus the added damping imparted by the head load and inherent damping characteristics of the material being conveyed has a relatively small effect on the vibrating action of the apparatus. Thus under loaded operating conditions the vibrating action of the apparatus of this invention for different frequency ratios on FIG. 6 is typically represented by a curve such as curve C on such figure. It will be noted that curve C is only slightly depressed relative to the unloaded operating curve B for the apparatus.

With the fairly high damping and high stiffness characteristics built into the apparatus by utilization of the elastomeric bodies 66 and 68 in compression to drive the apparatus through vibrations transferred along the line of attack axis (double arrows A), the stroke amplitude of the trough is substantially stabilized. The high damping minimizes the effect on the feeding action created by reason of internal material damping. The high stiffness of the elastomeric bodies minimizes the effect that the head load of material has on the feeding action. This has the advantage that the feed rate can be maintained more reliably constant irrespective of variations in the head load on the trough 14 at different times. A significant advantage thus flows from building a substantial amount of vibration damping into the apparatus by utilizing elastomer bodies in compression and with a high stiffness ratio to transmit vibrations to the trough. Then the amount of damping added by the head load of material is only a small factor and does not effect any serious change in the trough stroke while the apparatus is in operation, even where fairly wide variations in material head load are encountered during feeding operation of the apparatus.

As a specific example within apparatus contemplated by this invention a feeder would have a nominal 1800 r.p.m. motor giving the driver 16 a frequency of about 1800 cycles per minute. The natural frequency of the apparatus would then be tuned at about 20 percent higher than this frequency in the drive direction of the line of attack axis (double arrows A). By utilizing the high damping elastomer, operating in the compressive mode in this line of attack axis, internal damping becomes beneficial to the appratus' response to head load variations. Extraneous torsional and lateral modes of vibration are effectively eliminated by their being below the operating frequency of the driver and only the natural frequency of the apparatus in the direction of the line of attack axis is importantly above the driver frequency.

To achieve variation in the frequency of the driver or in the magnitude of vibratory thrust generated by the driver the prior art has recognized several different approaches for use with vibrating feeders of the type here under consideration. These approaches need not be described in detail herein although each, as may be desired, can be adopted in broadening the utility of the apparatus of this invention as described above.

Where an alternating current squirrel cage induction motor is employed to drive the eccentric rotating mass in the driver, varying the energizing voltage supplied to such motor may be undertaken to achieve variation in the frequency and stroke of the vibrations generated by the driver. Also by incorporating in the resilient supporting means for the driver a device having a variable spring rate it is possible to achieve changes in the vibratory operating characteristics of the apparatus. Further, by employing prior art suggestions for altering the magnitude of the thrust of the vibrations generated by the driver, change in the work produced by the vibratory movement of the apparatus can be obtained. For example, a thrust change may be achieved by changing the magnitude of the eccentric mass or by changing its degree of eccentricity relative to the rotating shaft in the driver.

However, despite the capability of obtaining variations in feed rate with a two mass vibratory material-handling apparatus such as has been described, the apparatus of this invention has particular advantages, as hereinbefore mentioned, where constant exciter frequency and constant thrust of the generated vibrations are employed. These advantages flow from the apparatus construction being rendered relatively insensitive to variations in the head load of material resting on the apparatus during its work producing operation.

It is to be understood that the form of invention herein shown and described is to be taken only as a preferred embodiment of the invention and that various changes and modifications in the arrangement of the components, elements and parts may be resorted to without departing from the spirit or scope of the appended claims.

We claim:

1. A vibratory material-handling apparatus comprising:
 a particulate material-handling assembly to be vibrated including a member to receive material and a driver-supporting frame attached to said member,
 means for resiliently supporting said assembly,
 a driver carried by said frame having motor means with a rotatable shaft coupled to drive an eccentric rotating mass to generate vibrations for exciting said member into work producing vibratory movement,
 resilient means providing the sole support for said driver on said frame for transmitting said vibrations to said member along a predetermined line of attack axis comprising a pair of elastomeric bodies disposed on opposite sides of said driver with said bodies generally aligned along said line of attack axis, each of said elastomeric bodies having oppositely facing end surfaces generally normal to said line of attack axis, one end surface of each body being secured to said frame and the other being secured to said driver with the axis of said motor means shaft disposed generally parallel to the planes of said end surfaces whereby said vibrations are transmitted to said member through compression of said elastomeric bodies, each of said bodies having exposed edge faces defining the boundaries of a shear plane disposed substantially perpendicular to said line of attack axis, said driver having no force-transmitting connection with said assembly other than said resilient means whereby vibrations other than along said attack axis are dissipated through shear flexure of said elastomeric bodies.

2. A vibratory material-handling apparatus as recited in claim 1 wherein said material receiving member consists of a trough along which particulate material is moved by said work-producing vibratory movement.

3. A vibratory material-handling apparatus as recited in claim 1 wherein said motor means includes an electric motor and said eccentric mass comprises at least one weight mounted eccentrically of the axis of the motor shaft.

4. A vibratory material-handling apparatus as recited in claim 3 wherein each elastomeric body is comprised of a plurality of spaced elastomeric units which units are aligned generally parallel to the axis of said motor means shaft.

5. A vibratory material handling apparatus as recited in claim 1 wherein each of said elastomeric bodies is comprised of at least two elastomer blocks with a plate laminated between adjacent blocks.

6. A vibratory material-handling apparatus as recited in claim 5 wherein said plate is aluminum and projects beyond the exposed edges of the blocks.

7. A vibratory material-handling apparatus comprising a first mass including a material-handling assembly having a feed path for moving material in a given direction, means mounting said first mass for free vibratory movement, a second mass including a rotatable shaft having an eccentric weight attached thereto whereby rotation of said shaft creates a rotating force vector transmitted by said shaft to said second mass, means for continuously rotating said shaft, and a pair of elastomeric members disposed on opposite sides of said second mass for connecting said second mass to said first mass, said elastomeric members providing the sole support for said second mass, said elastomeric members being arranged in a plane which includes said feed path and having parallel opposite end surfaces for engaging said first and second masses with the axis of said shaft extending generally parallel to the planes of said end surfaces whereby generally linear vibratory movement is transmitted to said first mass in a driving direction normal to said end surfaces through the compression of said elastomeric members, said second mass having no force-transmitting connection with said first mass other than said elastomeric member and the relative dimensions of said elastomeric members being such that vibratory forces generated in said second mass other than in said driving direction are substantially dissipated through the flexure of said elastomeric bodies in a direction normal to said driving direction.

8. A vibratory material-handling apparatus as set forth in claim 7 wherein each of said elastomeric members is comprised of a plurality of elastomeric blocks with a rigid but conducting plate being laminated between adjacent blocks, said plates extending in a direction parallel to said end surfaces of the elastomeric member.

9. A vibratory material-handling apparatus as set forth in claim 8 wherein said plates project laterally beyond the side faces of said blocks so as to provide exposed surfaces on said plates for improved heat dissipation.